US009569192B2

(12) United States Patent
Bronheim

(10) Patent No.: US 9,569,192 B2
(45) Date of Patent: Feb. 14, 2017

(54) CONFIGURING DEPENDENT SERVICES ASSOCIATED WITH A SOFTWARE PACKAGE ON A HOST SYSTEM

(71) Applicant: Red Hat Israel, Ltd., Raanana (IL)

(72) Inventor: Yaniv Bronheim, Haifa (IL)

(73) Assignee: Red Hat Israel, Ltd., Raanana (IL)

( * ) Notice: Subject to any disclaimer, the term of this patent is extended or adjusted under 35 U.S.C. 154(b) by 0 days.

(21) Appl. No.: 14/316,479

(22) Filed: Jun. 26, 2014

(65) Prior Publication Data

US 2015/0277886 A1    Oct. 1, 2015

Related U.S. Application Data

(60) Provisional application No. 61/972,594, filed on Mar. 31, 2014.

(51) Int. Cl.
  *G06F 9/455*  (2006.01)
  *G06F 9/445*  (2006.01)

(52) U.S. Cl.
  CPC ............ *G06F 8/61* (2013.01); *G06F 9/44552* (2013.01)

(58) Field of Classification Search
  None
  See application file for complete search history.

(56) References Cited

U.S. PATENT DOCUMENTS

| | | | |
|---|---|---|---|
| 8,819,673 B1* | 8/2014 | Wilkinson et al. | 718/1 |
| 2009/0172662 A1* | 7/2009 | Liu | 718/1 |
| 2009/0265707 A1* | 10/2009 | Goodman et al. | 718/1 |
| 2011/0154325 A1* | 6/2011 | Terasaki | 718/1 |
| 2011/0179414 A1* | 7/2011 | Goggin et al. | 718/1 |
| 2011/0271280 A1* | 11/2011 | Cao et al. | 718/1 |
| 2012/0167084 A1* | 6/2012 | Suit | 718/1 |
| 2012/0254353 A1* | 10/2012 | Baba et al. | 709/217 |
| 2013/0117742 A1* | 5/2013 | Newell | 718/1 |
| 2013/0160006 A1* | 6/2013 | Jeong et al. | 718/1 |
| 2013/0179879 A1* | 7/2013 | Zhang et al. | 718/1 |
| 2013/0185715 A1* | 7/2013 | Dunning et al. | 718/1 |
| 2013/0219388 A1* | 8/2013 | Moeller | G06F 9/45558 718/1 |
| 2013/0326505 A1* | 12/2013 | Shah | 718/1 |
| 2014/0101656 A1* | 4/2014 | Zhu | H04L 63/0227 718/1 |
| 2014/0109082 A1* | 4/2014 | Kimmet et al. | 717/176 |
| 2014/0130047 A1* | 5/2014 | Wang et al. | 718/1 |
| 2014/0359620 A1* | 12/2014 | Van Kerkwyk et al. | 718/1 |

* cited by examiner

*Primary Examiner* — Isaac T Tecklu
(74) *Attorney, Agent, or Firm* — Lowenstein Sandler LLP

(57) ABSTRACT

A software package to be installed on a host system may be received. Services of the host system that are associated with the software package may be identified. Furthermore, a determination may be made if at least one service associated with the software package are currently used by at least one virtual machine associated with the host system. If at least one service is currently used by at least one virtual machine then a notification may be provided.

20 Claims, 5 Drawing Sheets

US 9,569,192 B2

CONFIGURING DEPENDENT SERVICES ASSOCIATED WITH A SOFTWARE PACKAGE ON A HOST SYSTEM

RELATED APPLICATION

This application claims the benefit under 35 U.S.C. §119(e) of U.S. Provisional Application 61/972,594 filed on Mar. 31, 2014.

TECHNICAL FIELD

Aspects of the disclosure generally relate to services and, more specifically, relate to configuring dependent services associated with a software package on a host system.

BACKGROUND

A virtual machine (VM) may be considered a software-based emulation of computer hardware. For example, the virtual machine may operate based on computer architecture and functions of the computer hardware resources. Thus, the virtual machine may emulate a physical computing environment, but requests for CPU, memory, hard disk, network, and other hardware resources may be managed by a virtualization layer which translates these requests to the underlying physical computing hardware resources. The virtualization layer may be part of a virtual machine management application.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
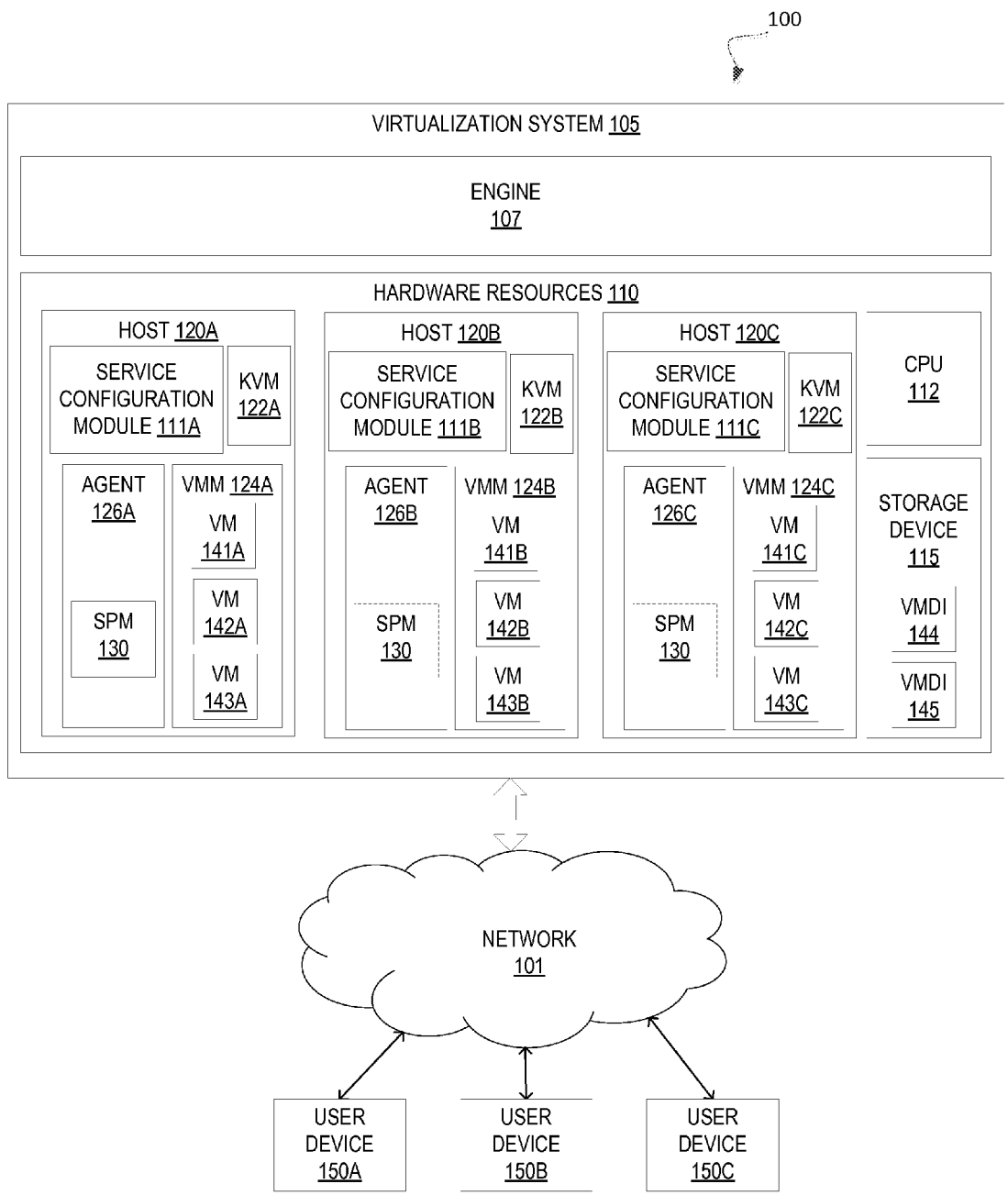
FIG. 1 illustrates an example system architecture in which embodiments of the disclosure may operate.

Embodiments of the disclosure relate to a service configuration module to configure a service associated with a software package that is to be installed on a host system. A service may be provided by a host system. In some embodiments, a service may refer to a software function or a hardware function that is provided by a host system. Examples of services include, but are not limited to, a network service, a storage service, or a software library or application program interface (API). In some embodiments, a network service may refer to network functionality of the host system and a storage service may refer to storage functionality of the host system. Furthermore, a software library provided by the host system may include, but is not limited to, libvirt, which may refer to a software library to provide virtualization management software functions.

The host system may run or execute multiple virtual machines. In some embodiments, each of the virtual machines that are running on the host system may use one or more services provided by the host system. For example, a first virtual machine that is running on the host system may use or depend upon a first service (e.g., a storage service) of the host system and a second service. Furthermore, a second virtual machine that is also running on the host system may also use or depend upon the first service as well as a third service that is provided by the host system. A user or administrator of the host system may install a software package onto the host system. For example, the software package may be a software application such as a virtual machine manager. A user or administrator of the host system may use the virtual machine manager software package to monitor and manage virtual machines that are running or executed on the host system. However, the installing of such a software package may require the reconfiguring of services that are currently used by virtual machines of the host system. For example, in order to successfully install the software package (e.g., the virtual machine management software package) on the host system, one or more services that are provided by the host system may need to be reconfigured based on settings or configurations required by the software package that is to be installed. Furthermore, the one or more services that are needed to be reconfigured may need to be restarted as part of the reconfiguring process. In some embodiments, a service that needs to be reconfigured and/or restarted in response to the installation of the software package may be referred to as a dependent service of the software package.

Thus, if the software package is installed on a host system that is currently running one or more virtual machines, services that are used by the virtual machines may need to be reconfigured to support the software package. However, since the services may need to be restarted as part of the reconfiguration process, services that are used by the virtual machines may be unavailable or changed. For example, as previously mentioned, a first virtual machine may use a first service and a second service that are provided by a host system and a second virtual machine may use the first service and a third service that are provided by the host system. The software package may be dependent upon the first service that is provided by the host system. Thus, if the first service is reconfigured and/or restarted, in response to the installation of the software package, the first virtual machine and the second virtual machine may be inaccessible or inoperable since both virtual machines also use or depend upon the first service. Accordingly, if a user or administrator of the host system installs the software package to manage the virtual machines of the host system, the installation process of the software package may automatically reconfigure the dependent services and may thus disable the virtual machines that are currently running or executed on the host system. Such automatic disabling of the virtual machines may be problematic to a user or administrator of the host system.

In some embodiments, a service configuration module may identify or receive a software package to be installed on the host system and may identify dependent services of the software package. Furthermore, the service configuration module may determine if any of the dependent services of the software package are currently used by virtual machines that are running or executed on the host system. In some embodiments, if any of the dependent services are also used by virtual machines of the host system, then a user or administrator may be notified of such a situation and the user or administrator of the host system may decide to continue installing the software package or not to install the software package based on the dependent services that are also used by virtual machines.

FIG. 1 illustrates an example system architecture 100 in which embodiments of the disclosure may operate. The system architecture 100 includes a virtualization system 105 coupled to and accessible over a network 101 by a number of user devices 150A-150C. The virtualization system 105 includes a variety of hardware resources 110 which may include, but is not limited to, desktop computers, laptop computers, rackmount servers, routers, switches, tablet computers, mobile phones, or any other type of computing device. The hardware resources 110 may include one or more processing devices, memory, and/or additional devices including, but not limited to, a graphics card, hardware RAID controller, network controller, hard disk drive, universal serial bus (USB) device, internal input/output (I/O) device, keyboard, mouse, speaker, etc. The hardware resources 110 may be used to execute software, including one or more operating systems, virtual machines, or other applications. The virtualization system also includes an engine 107 (which may execute on a portion of the hardware resources 110 or a separate engine device) that manages the hardware resources 110 and the processes running on the hardware resources 110.

The hardware resources 110 include a number of hosts 120A-120C (or host machines or systems) each including a portion of the hardware resources 110. The hosts 120A-120C may each include one or more processing devices and one or more storage devices. The hardware resources 110 may further include one or more additional processing devices 112 and one or more additional storage devices 115. Furthermore, each host 120A-120C may provide one or more services such as, but not limited to, networking services, storage services, and software libraries. In some embodiments, the VMMs 124A-124C and/or the virtual machines 141A-141C, 142A-142C, and 143A-143C may use the one or more services that are provided by the hosts 120A-120C.

Each of the hosts 120A-120C includes a kernel space and a user space defined by the hardware resources of the host 120A-120C. A kernel-based virtual machine (KVM) 122A-122C is executed in the kernel space of the host 120A-120C. The KVM 122A-122C allows a host 120A-120C to make its hardware and software resources or services available to virtual machines 141A-143C and/or VMMs 124A-124C which may be executed in the user space.

Each of the hosts 120A-120C may execute a virtual machine monitor (VMM) 124A-124C (or a hypervisor or software package to be installed on the host systems as described herein). The VMM 124A-124C is an application that executes on a host 120A-120C to manage virtual machines 141A-143C. In particular, the VMM 124A-124C may instantiate or start, migrate, pause, or perform another type of event associated with virtual machines 141A-143C. The VMM 124A-124C may include a virtualization API and a multi-platform emulator. Each virtual machine 141A-143C may execute a guest operating system that can be accessed by a user device 150A-150C over the network 101. Each virtual machine 141A-143C may further run guest applications using the guest operating system.

Each of the hosts 120A-120C may include an agent 126A-126C. The agent 126A-126C may facilitate inter-host communication and perform various monitoring and administrative tasks. The agent 126A-126C may also include functionality for acting as a storage pool manager (SPM) 130. However, in some embodiments, one of the hosts 120A may be active as the SPM at any one time. The host 120A may be designated an active SPM 130 by the engine 107. The SPM 130 coordinates metadata changes in the virtualization system 105, such as creating and deleting disk images, creating and merging snapshots, copying images between storage domains, creating templates and storage allocation for block devices of the hardware resources 110 such as hard drives or other storage devices.

A storage domain is a collection of data structures that have a common storage interface. A storage domain may contain complete images of templates and virtual machines (including snapshots). A storage domain may comprise one or more block devices, one or more storage devices, one or more file systems, one or more volumes, and/or portions thereof.

As shown in FIG. 1, each of the hosts 120A-120C may include a service configuration module 111A-111C. In some embodiments, the service configuration modules 111A-111C may configure services that are used by the virtual machines 141A-141C, 142A-142C, and 143A-143C as well as software packages to be installed on the hosts 120A-120C (e.g., the VMMs 124A-124C). The services may be configured in response to an installation of a software package on any of the hosts 120A-120C. Further details with regard to the service configuration modules 111A-111C are disclosed below.

Figure 2:
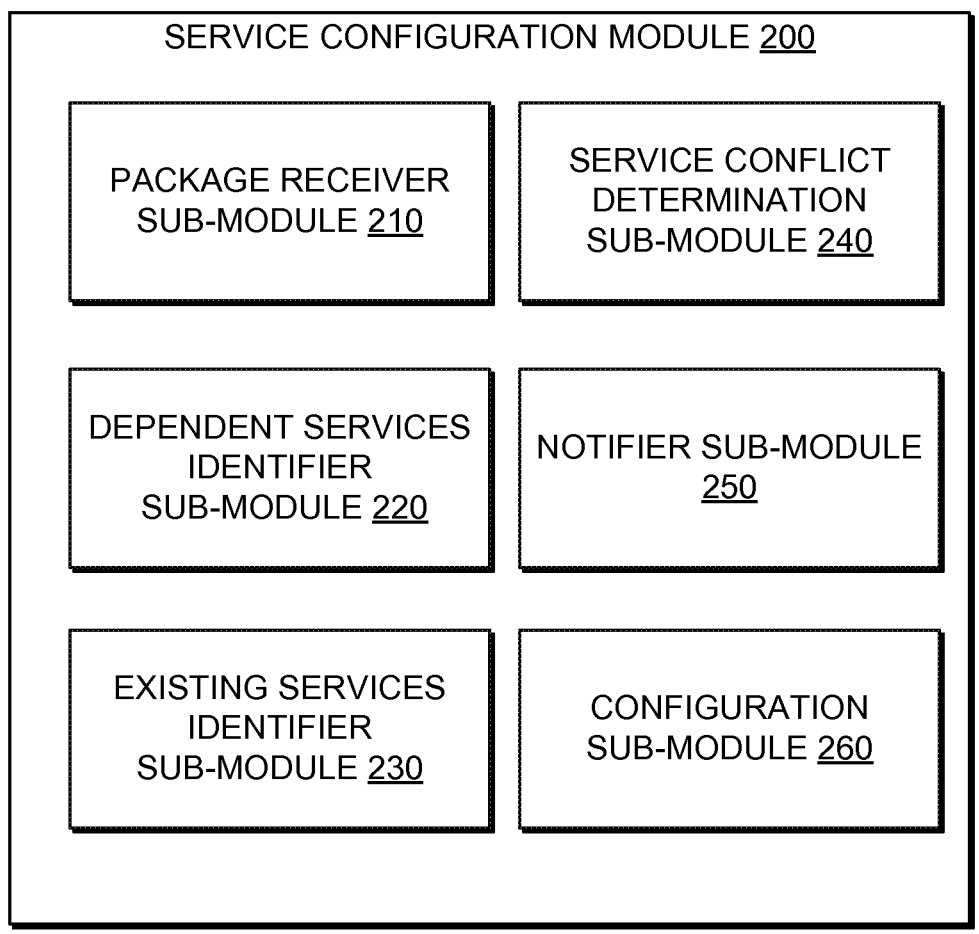
FIG. 2 is a block diagram of an example service configuration module in accordance with some embodiments of the disclosure.

FIG. 2 is a block diagram of an example service configuration module 200 in accordance with some embodiments of the disclosure. In general, the service configuration module 200 may correspond to the service configuration module 111A-111C of FIG. 1. The service configuration module 200 may include a package receiver sub-module 210, a dependent services identifier sub-module 220, an existing services identifier sub-module 230, a conflict determination sub-module 240, a notifier sub-module 250, and a configuration sub-module 260. In alternative embodiments, the functionality of one or more of the sub-modules may be combined or divided.

As shown in FIG. 2, the service configuration module 200 may include a package receiver sub-module 210. In some embodiments, the package receiver sub-module 210 may receive or identify a software package. For example, the package receiver sub-module 210 may receive or identify a software package that is to be installed on a host system. In some embodiments, the software package may be a software application that is used to manage and/or monitor virtual machines that are running or executed on the host system. For example, the software package may be a virtual desktop and server manager (VDSM) tool that is used to manage and monitor the storage, memory, and networks associated with the host system as well as to control the creation and management of virtual machines on the host system. Furthermore, the software package may perform host system administration tasks, gather statistics associated with the host system, and create a log file associated with the host system.

The service configuration module 200 may further include a dependent services identifier sub-module 220. In some embodiments, the dependent services identifier sub-module 220 may identify services associated with the software package that is to be installed on the host system. For example, the dependent services identifier sub-module 220 may identify one or more services that are provided by a host system that will need to be used by the software package that is received or identified by the package receiver sub-module 210. In some embodiments, the dependent services identifier sub-module 220 may identify multiple services, such as a network service, storage service, and a software library (e.g., a software library to provide virtualization management software functions) that are provided by the host system and that will be used by the software package after it has been installed on the host system. Such services that will be used by the software package after it has been installed on the host system may be referred to as dependent services. The service configuration module 200 may further include an existing services identifier sub-module 230. In some embodiments, the existing services identifier sub-module 230 may identify one or more services that are provided by the host system and that are currently used by one or more virtual machines that are running or executed on the host system. Such services that are currently used by one or more virtual machines that are running or executed on the host system may be referred to as existing services.

Returning to FIG. 2, the service configuration module 200 may include a service conflict determination module 240. In some embodiments, the service conflict determination module 240 may identify a conflict associated between one or more dependent services and one or more existing services. For example, the service conflict determination module 240 may determine if a dependent service for a software package to be installed on a host system that has been identified by the dependent services identifier sub-module 220 is also identified by the existing services sub-module 230 as an existing service that is currently used by a virtual machine of the host system to which the software package is to be installed. In some embodiments, the service conflict determination module 240 may identify if a dependent service matches an existing service. For example, a first network service, a second network service, a first storage service, and a second storage service provided by the host system may be identified as existing services used by virtual machines of the host system. Furthermore, dependent services of a software package to be installed may be identified. For example, the identified dependent services may be the first network service, a third network service, and the second storage service. In such an example, the service conflict determination sub-module 240 may identify that the first network service and the second storage service match both the dependent services and the existing services. Thus, the service conflict determination sub-module 240 may identify a conflict with the first network service and the second storage service. In some embodiments, a conflict may refer to a service that will be used by the software package to be installed and is currently used by a virtual machine of a host system and will be reconfigured and/or restarted in response to the installation of the software package on the host system.

As shown in FIG. 2, the service configuration module 200 may further include a notifier sub-module 250. In some embodiments, the notifier sub-module 250 may notify a user or administrator of a conflict between a dependent service and an existing service. For example, if a particular service will need to be configured in response to an installation of a software package and if the particular service is currently used by a virtual machine of a host system, then a user or administrator may be notified of the conflict associated with the particular service. Furthermore, the service configuration module 200 may include a configuration sub-module 260. In some embodiments, the configuration sub-module 260 may configure a dependent service. For example, the configuration sub-module 260 may configure a network service, a storage service, or a software library provided by a host system. In some embodiments, the configuring of the software library (e.g., a library for providing virtualization management software functions) may involve the providing of a particular version of the software library, the configuring of a network service may involve the changing of a network parameter such as a network bridge, and the configuring of a storage service may involve the changing of storage connections for the host system.

Figure 3:
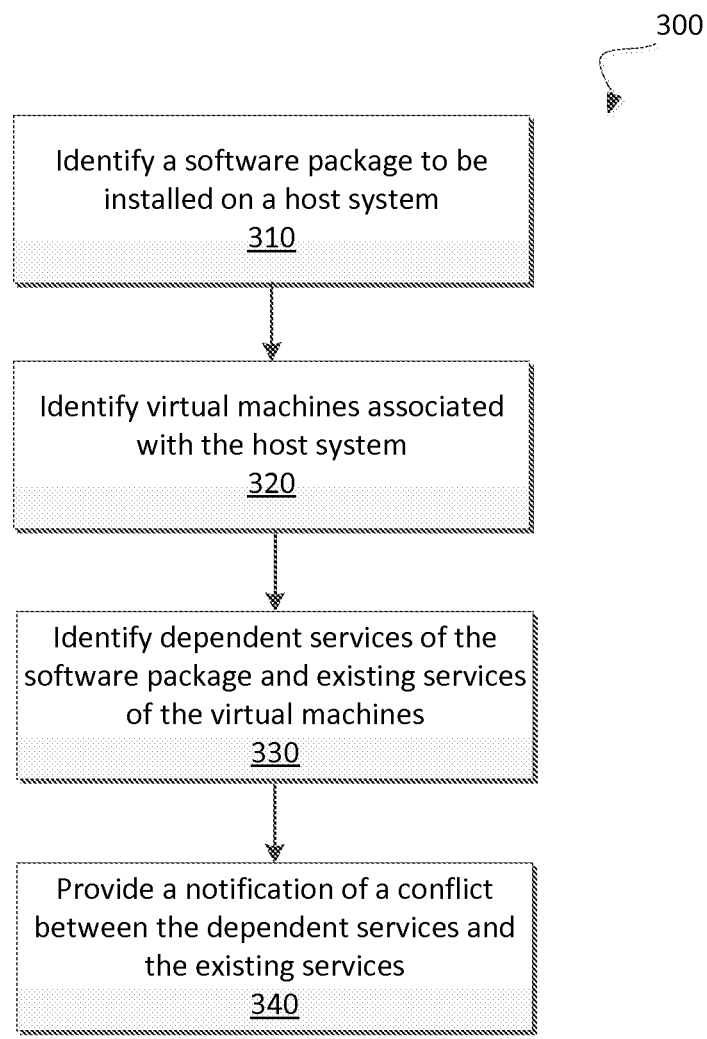
FIG. 3 is an illustrated example method to provide a notification of a conflict with a service in accordance with some embodiments.

FIG. 3 illustrates an example method 300 to provide a notification of a conflict with a service in accordance with some embodiments. The method 300 may be performed by processing logic that may comprise hardware (e.g., processing device, circuitry, dedicated logic, programmable logic, microcode, etc.), software (e.g., instructions run or executed on a processing device), or a combination thereof. In some embodiments, the method 300 may be performed by the service configuration module 200 of FIG. 2.

As shown in FIG. 3, the method 300 may begin with the processing logic identifying a software package (e.g., a VDSM software package) to be installed on a host system (block 310). For example, the processing logic may identify that a user or administrator has initiated the installation of the software package on a host system. The processing logic may further identify virtual machines that are currently running or executed on the host system (block 320). In some embodiments, the processing logic may also identify software functions that are implemented by the host system. For example, the processing logic may identify that the host system is providing a web or email function. The processing logic may identify dependent services of the software package and existing services of the virtual machines (block 330). For example, the processing logic may identify services of the host system that the software package will use after its installation (e.g., dependent services) and may also identify services of the host system that are currently used by virtual machines that are running or executed on the host system (e.g., existing services).

Furthermore, the processing logic may provide a notification of any conflict between the dependent services and the existing services (block 340). For example, the processing logic may identify if any service of the existing services associated with the software package is currently used by a virtual machine. In some embodiments, a user or administrator installing the software package may be provided with a notification that may alert the user or administrator that at least one of the virtual machines currently running on the host system may be impacted by the installation of the software package as an existing service used by the virtual machine may be changed (e.g., a configuration setting will be changed) in response to the configuration of the service that is performed in response to the installation of the software package. For example, the notification may identify the particular service that will be reconfigured in response to the installation of the software package on the host system. In some embodiments, the notification may further provide information associated with an amount of time that the service may be unavailable in response to the installation of the software package, whether the service will be restarted or will not be restarted in response to the installation of the software package, and how the service will be changed in response to the installation of the software package. For example, a network service, a storage service, and a software library (e.g., libvirt) may be identified as dependent services that will be used by the software package as well as be identified as existing services that are currently used by virtual machines of the host system. In some embodiments, the notification may include information identifying the network service, the storage service, and the software library. For example, the notification may further include that the network service will be unavailable for a particular amount of time and will be restarted in response to the installation of the software package and that configuring of the network service will change a network bridge associated with the network service. Furthermore, the notification may further include that the storage service will be unavailable for another amount of time and will not be restarted in response to the installation of the software package and that configuring of the storage service will change a type of storage device associated with the storage service. In some embodiments, notification may further include that the software library will be changed to a different version and that it will be unavailable for a particular amount of time.

In an alternative embodiment, if a service is identified as a dependent service of the software package and is also identified as an existing service of a virtual machine, but the configuring of the service in response to the software package does not change any configuration settings of the service with respect to the virtual machine, then the service may not be included in the notification including information identifying a conflict. For example, if a network service is identified as a dependent service and is also identified as an existing service, but if any configuration settings of the network service are not changed in response to the installation of the software package, then the network service may not be included in the notification. Thus, in some embodiments, if the reconfiguring of a service in response to the installation of the software package will not impact a virtual machine of the host system (e.g., the activity of the virtual machine is not disabled), then the service may not be included in the notification.

Figure 4:
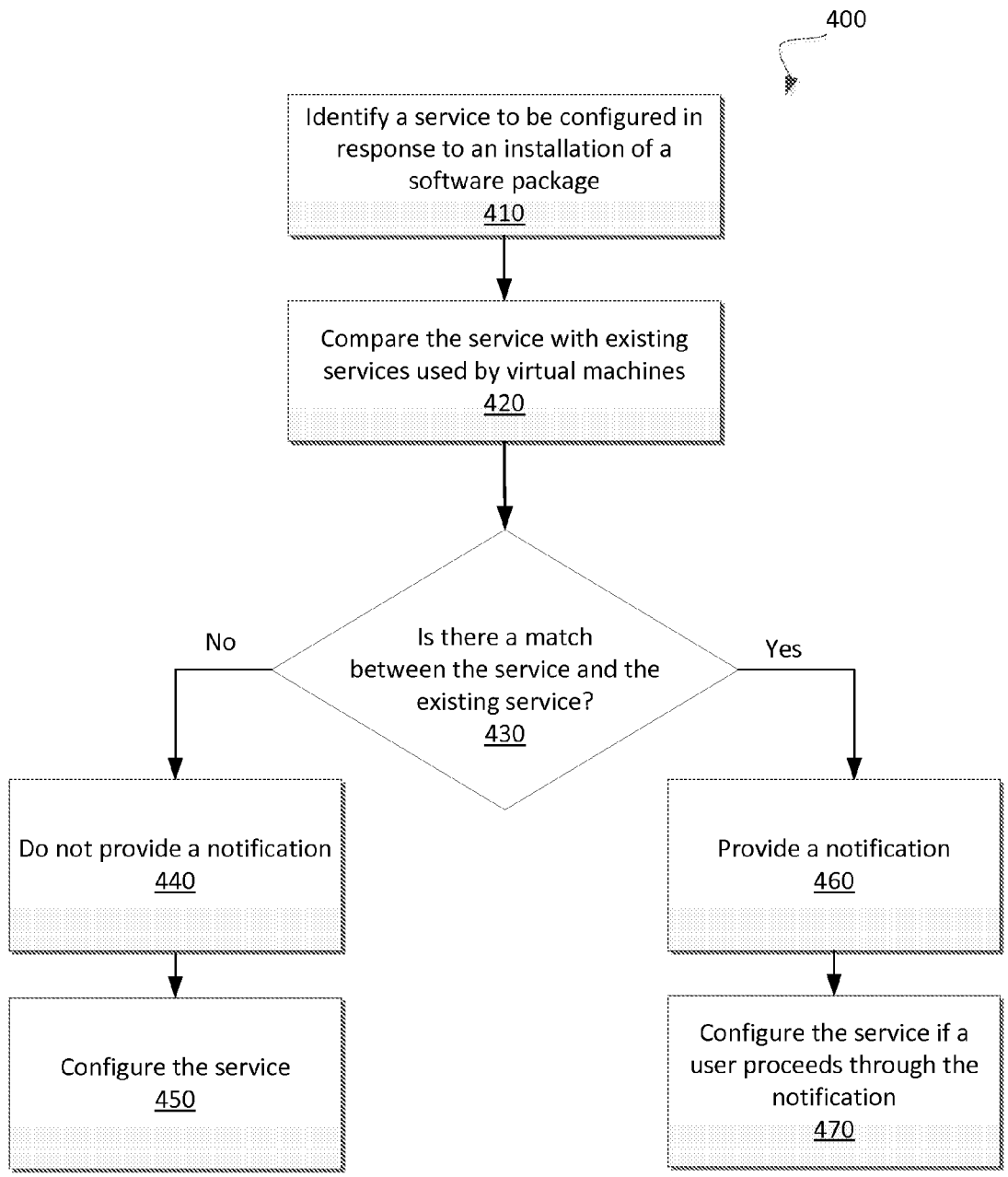
FIG. 4 is an illustrated example method to configure a dependent service of a software package to be installed on a host system in accordance with some embodiments of the disclosure.

FIG. 4 is an illustrated example method 400 to configure a dependent service of a package to be installed on a host system in accordance with some embodiments of the disclosure. The method 400 may be performed by processing logic that may comprise hardware (e.g., processing device, circuitry, dedicated logic, programmable logic, microcode, etc.), software (e.g., instructions run or executed on a processing device), or a combination thereof. In some embodiments, the method 400 may be performed by the service configuration module 200 of FIG. 2.

As shown in FIG. 4, the method 400 may begin with the processing logic identifying a service to be configured in response to an installation of a software package (block 410). For example, the processing logic may identify a VDSM software package that is to be installed on a host system. The processing logic may further compare the service with existing services that are used by virtual machines currently running on the host system (block 420). The processing logic may further determine if there is a match between the service and the existing services (block 430). For example, the processing logic may identify if the service that is to be configured in response to the installation of the VDSM software package is also a service that is currently used by one or more virtual machines of the host system. If the service that is to be configured in response to the installation of the VDSM software package is not a service that is currently used by one or more virtual machines of the host system, then no notification may be provided (block 440). Furthermore, the service may be configured without the providing of such a notification (block 450). However, if the service that is to be configured in response to the installation of the VDSM software package is a service that is currently used by one or more virtual machines of the host system, then a notification may be provided (block 460). For example, the notification may identify the service that matches at least one of the existing services used by the virtual machines. Furthermore, if a user decides to progress through the notification (e.g., accepts the changes associated with the service), the processing logic may configure the service (block 470).

Figure 5:
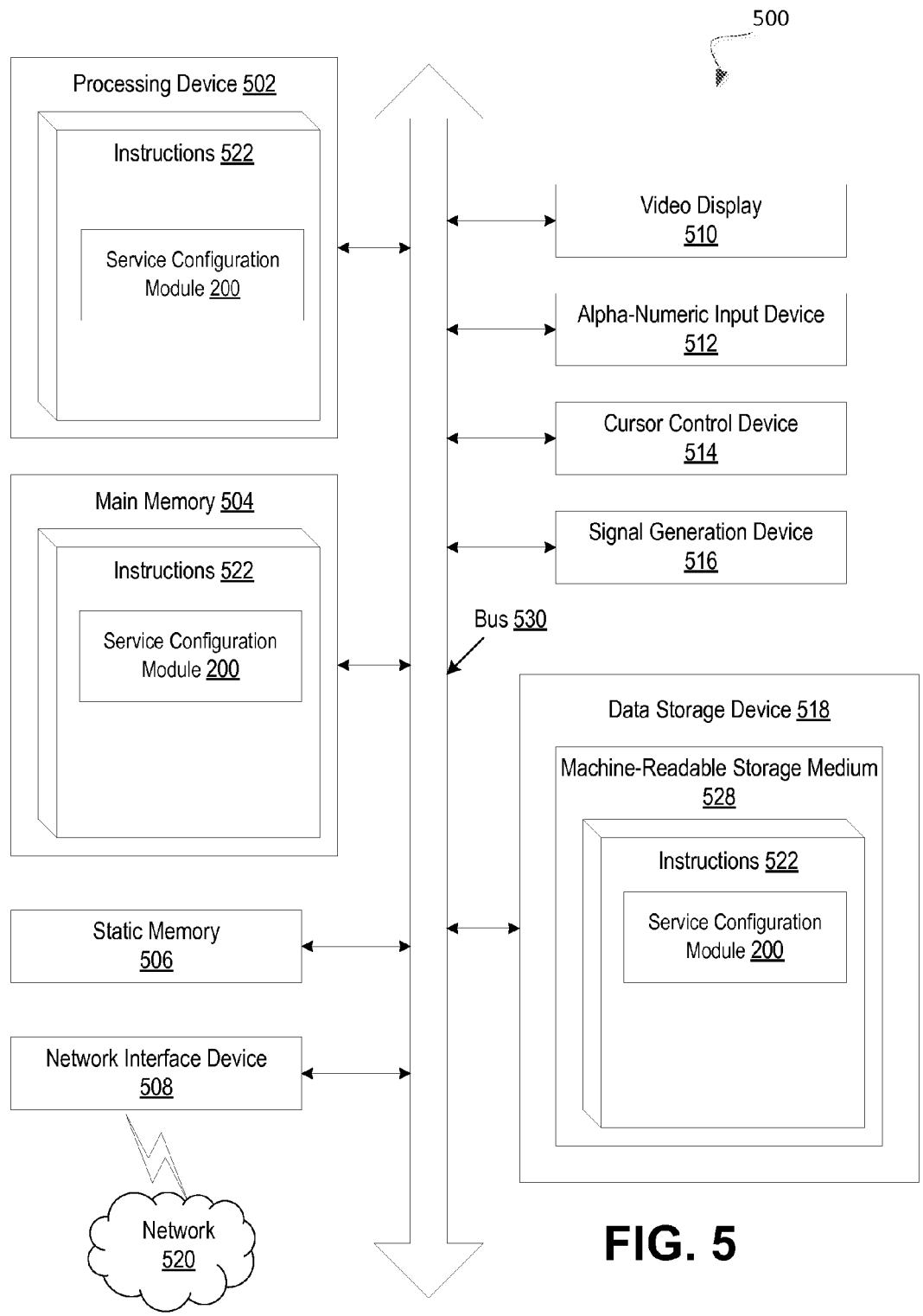
FIG. 5 illustrates a block diagram of an embodiment of a computer system in which some embodiments of the disclosure may operate.

FIG. 5 illustrates an example machine of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute instructions 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-readable storage medium 528 (also known as a computer-readable medium) on which is stored one or more sets of instructions or software 522 embodying any one or more of the methodologies or functions described herein. The instructions 522 may also reside, completely or at least partially, within the main memory 504 and/or within the processing device 502 during execution thereof by the computer system 500, the main memory 504 and the processing device 502 also constituting machine-readable storage media.

In one implementation, the instructions 522 include instructions for a row module (e.g., service configuration module 111A-111C of FIG. 1 and/or service configuration module 200 of FIG. 2) and/or a software library containing methods that call modules or sub-modules in a service configuration module. While the machine-readable storage medium 528 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
receiving a software package to be installed on a host system;
identifying a plurality of services of the host system that are associated with the software package and that are unavailable during an installation of the software package on the host system that changes a configuration of the plurality of services;
determining, by a processing device, whether a service of the plurality of services that is unavailable during the installation of the software package on the host system that changes the configuration of the service is being used by a virtual machine (VM) that is running on the host system; and
providing a notification in view of the determination of the service associated with the software package being used by the VM that is running on the host system.

2. The method of claim 1, wherein the plurality of services of the host system that are associated with the software package are services that are to be configured in response to the installation of the software package on the host system.

3. The method of claim 1, further comprising:
determining whether a configuration setting of the service associated with the software package will be changed in response to an installation of the software package, wherein the providing of the notification is further in view of the determination of the configuration setting of the service associated with the software package being changed in response to the installation of the software package.

4. The method of claim 1, further comprising:
receiving, after the providing of the notification, a selection to install the software package; and
configuring, after an installation of the software package, the service in view of the software package.

5. The method of claim 1, wherein the notification comprises an identification of the service and an identification of a change of the service in response to an installation of the software package.

6. The method of claim 5, wherein the notification further comprises an indication that the service will be unavailable for an identified amount of time in response to the installation of the software package.

7. The method of claim 1, wherein the software package is a virtual machine management application.

8. A system comprising:
a memory to store a software package; and
a processing device operatively coupled with the memory, to:
receive the software package to be installed on a host system;
identify a plurality of services of the host system that are associated with the software package and that are unavailable during an installation of the software package on the host system that changes a configuration of the plurality of services;
determine whether a service of the plurality of services that is unavailable during the installation of the software package on the host system that changes the configuration of the service is being used by a virtual machine (VM) that is running on the host system; and
provide a notification in view of the determination of the service associated with the software package being used by the VM that is running on the host system.

9. The system of claim 8, wherein the plurality of services of the host system that are associated with the software package are services that are to be configured in response to the installation of the software package on the host system.

10. The system of claim 8, wherein the processing device is further to:
determine whether a configuration setting of the service associated with the software package will be changed in response to an installation of the software package,
wherein the providing of the notification is further in view of the determination of the configuration setting of the service associated with the software package being changed in response to the installation of the software package.

11. The system of claim 8, wherein the processing device is further to:
receive, after the providing of the notification, a selection to install the software package; and
configure, after an installation of the software package, the service in view of the software package.

12. The system of claim 8, wherein the software package is a virtual machine management application.

13. The system of claim 8, wherein the notification comprises an identification of the service and an identification of a change of the service in response to an installation of the software package.

14. The system of claim 13, wherein the notification further comprises an indication that the service will be unavailable for an identified amount of time in response to the installation of the software package.

15. A non-transitory machine-readable storage medium comprising data that, when accessed by a processing device, cause the processing device to:
receive a software package to be installed on a host system;
identify a plurality of services of the host system that are associated with the software package and that are unavailable during an installation of the software package on the host system that changes a configuration of the plurality of services;
determine, by the processing device, whether a service of the plurality of services that is unavailable during the installation of the software package on the host system that changes the configuration of the service is being used by a virtual machine (VM) that is running on the host system; and
provide a notification in view of the determination of the service associated with the software package being used by the VM that is running on the host system.

16. The non-transitory machine-readable storage medium of claim 15, wherein the plurality of services of the host system that are associated with the software package are services that are to be configured in response to the installation of the software package on the host system.

17. The non-transitory machine-readable storage medium of claim 15, wherein the processing device is further to:
determine whether a configuration setting of the service associated with the software package will be changed in response to an installation of the software package,
wherein the providing of the notification is further in view of the determination of the configuration setting of the service associated with the software package being changed in response to the installation of the software package.

18. The non-transitory machine-readable storage medium of claim 15, wherein the processing device is further to:
receive, after the providing of the notification, a selection to install the software package; and
configure, after an installation of the software package, the service in view of the software package.

19. The non-transitory machine-readable storage medium of claim 15, wherein the notification comprises an identification of the service and an identification of a change of the service in response to an installation of the software package.

20. The non-transitory machine-readable storage medium of claim 19, wherein the notification further comprises an indication that the service will be unavailable for an identified amount of time in response to the installation of the software package.

* * * * *